(12) United States Patent
Tang et al.

(10) Patent No.: US 12,511,469 B2
(45) Date of Patent: Dec. 30, 2025

(54) TEXT DISPLAY METHOD, DEVICE, APPARATUS AND STORAGE MEDIUM

(71) Applicant: Beijing Zitiao Network Technology Co., Ltd., Beijing (CN)

(72) Inventors: Hongwei Tang, Beijing (CN); Wei Feng, Beijing (CN); Jun Wen, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 202 days.

(21) Appl. No.: 18/569,934

(22) PCT Filed: Oct. 28, 2022

(86) PCT No.: PCT/CN2022/128271
§ 371 (c)(1),
(2) Date: Dec. 13, 2023

(87) PCT Pub. No.: WO2023/078175
PCT Pub. Date: May 11, 2023

(65) Prior Publication Data
US 2025/0131180 A1    Apr. 24, 2025

(30) Foreign Application Priority Data
Nov. 4, 2021 (CN) .......................... 202111300804.X

(51) Int. Cl.
G06F 40/106    (2020.01)
(52) U.S. Cl.
CPC .................. G06F 40/106 (2020.01)

(58) Field of Classification Search
CPC .... G06F 40/106; G06F 3/0482; G06F 3/1243; G06F 40/103; G06F 40/174; B41J 11/0095
See application file for complete search history.

(56) References Cited

U.S. PATENT DOCUMENTS 5,748,927 A * 5/1998 Stein ................... G06F 3/04895
715/835
10,031,642 B2 * 7/2018 Schulz .................. G06F 3/0482
(Continued)

FOREIGN PATENT DOCUMENTS

CN        102708774 A     10/2012
CN        105897875 A      8/2016
(Continued)

OTHER PUBLICATIONS

International Search Report and Written Opinion received for PCT Patent Application No. PCT/CN22/128271, mailed on Jan. 19, 2023, 8 pages (2 pages of English Translation and 6 pages of Original Document).

*Primary Examiner* — Toan H Vu

(57) ABSTRACT

The present disclosure relates to a text display method, device, apparatus, and storage medium, and the method comprises: determining a length of entered text within a first container and a current width of the first container, if it is determined that the current width of the first container is less than the length of the entered text, determining a target truncated character from the entered text; then deleting characters behind the target truncated character in the entered text, and adding a preset symbol at a next position adjacent to the target truncated character to obtain a truncated text corresponding to the entered text; and displaying the truncated text in the first container.

18 Claims, 4 Drawing Sheets

(56) References Cited

U.S. PATENT DOCUMENTS

| | | | |
|---|---|---|---|
| 2009/0164934 A1* | 6/2009 | Bhattiprolu | G06F 3/0483 |
| | | | 715/777 |
| 2010/0026738 A1* | 2/2010 | Saikawa | B41J 11/0095 |
| | | | 347/1 |
| 2013/0156322 A1 | 6/2013 | Yaros | |
| 2014/0372874 A1* | 12/2014 | Marseille | G06F 40/174 |
| | | | 715/243 |
| 2015/0026568 A1* | 1/2015 | Zhao | G06F 40/103 |
| | | | 715/254 |
| 2019/0087137 A1* | 3/2019 | Yasui | G06F 3/1243 |

FOREIGN PATENT DOCUMENTS

| | | |
|---|---|---|
| CN | 111400998 A | 7/2020 |
| CN | 113408241 A | 9/2021 |
| CN | 113552984 A | 10/2021 |

\* cited by examiner

TEXT DISPLAY METHOD, DEVICE, APPARATUS AND STORAGE MEDIUM

CROSS REFERENCE TO RELATED APPLICATION

This application is a U.S. National Stage Application under 35 U.S.C. § 371 of International Patent Application No. PCT/CN2022/128271, which claims the benefit of priority from the Chinese application No. 202111300804.X, entitled "TEXT DISPLAY METHOD, APPARATUS, DEVICE AND STORAGE MEDIUM" and filed on Nov. 4, 2021, the contents of both of which are hereby incorporated by reference in their entirety for all purposes.

TECHNICAL FIELD

The present disclosure relates to a text display method, device, apparatus, and storage medium.

BACKGROUND

In User Interface (UI) design software, when a piece of text is to be displayed on a certain control, a designer can manually copy and paste the text into a container corresponding to the control, and manually delete characters beyond the container. Obviously, this way of manually handling text display reduces the work efficiency of the designer.

SUMMARY

In a first aspect, the present disclosure provides a text display method, method comprising:
  determining a length of entered text within a first container and a current width of the first container; the first container is used for bearing texts displayed on a target control;
  if it is determined that the current width of the first container is less than the length of the entered text, determining a target truncated character from the entered text; wherein the entered text comprises a plurality of characters;
  deleting characters behind the target truncated character in the entered text, and adding a preset symbol at a next position adjacent to the target truncated character to obtain a truncated text corresponding to the entered text; and
  displaying the truncated text in the first container.

In an alternative embodiment, the determining a length of entered text within a first container and a current width of the first container comprises: in response to an adjustment operation on the current width of the first container, determining the length of the entered text within the first container and the current width of the first container.

In an alternative embodiment, the determining a target truncated character from the entered text comprises:
  determining a length from a first character to a current traversal character in the entered text as a first length;
  determining a length from the first character to a next character adjacent to the current traversal character in the entered text as a second length; and
  when it is determined that a sum of the first length and a width of the preset symbol is not larger than the current width of the first container and a sum of the second length and the width of the preset symbol is larger than the current width of the first container, determining the current traversal character as the target truncation character.

In an alternative embodiment, before the determining a length from a first character to a current traversal character in the entered text as a first length, the method further comprises:
  traversing from last character of the entered text forward or from the first character of the entered text backward, to determine the current traversed character.

In an alternative embodiment, after displaying the truncated text in the first container, the method further comprises:
  in response to an adjustment operation on the current width of the first container, determining whether the current width of the first container is less than the length of the entered text; and
  if it is determined that the current width of the first container is not less than the length of the entered text, displaying the entered text in the first container after replacing the truncated text with the entered text.

In an alternative embodiment, after displaying the truncated text in the first container, the method further comprises:
  in response to an adjustment operation on a current height of the first container, determining whether a height of the truncated text displayed within the first container is greater than the current height of the first container; and
  if it is determined that the height of the truncated text is larger than the current height of the first container, cutting the truncated text displayed in the first container.

In a second aspect, the present disclosure provides a text display device, the device comprising:
  a first determining module, configured to determine a length of entered text within a first container and a current width of the first container; the first container is used for bearing texts displayed on a target control;
  a second determining module, configured to determine a target truncated character from the entered text when it is determined that the current width of the first container is less than the length of the entered text; wherein the entered text comprises a plurality of characters;
  a truncation module configured to deleting characters behind the target truncated character in the entered text, and adding a preset symbol at a next position adjacent to the target truncated character to obtain a truncated text corresponding to the entered text; and
  a display module configured to display the truncated text in the first container.

In a third aspect, the present disclosure provides a non-transitory computer-readable storage medium having stored therein instructions that, when executed on a terminal device, cause the terminal device to perform the above method.

In a fourth aspect, the present disclosure provides an apparatus comprising: a memory, a processor, and a computer program stored on the memory and executable on the processor, the processor, when executing the computer program, performs the above method.

In a fifth aspect, the present disclosure provides a computer program product comprising a computer program/instructions which, when executed by a processor, perform the above method.

In a sixth aspect, the present disclosure provides a computer program which, when executed by a processor, performs the above method.

BRIEF DESCRIPTION OF THE DRAWINGS

In order to more clearly illustrate the embodiments of the present disclosure or technical solutions in the related art, the drawings used in the description of the embodiments or related technologies will be briefly described below, and it is obvious for those skilled in the art to obtain other drawings without creative work.

DETAILED DESCRIPTION

In order that the above objects, features and advantages of the present disclosure can be more clearly understood, aspects of the present disclosure will be further described below. It should be noted that, the embodiments and features in the embodiments of the present disclosure can be combined with each other without conflict.

In the following description, numerous specific details are set forth in order to provide a thorough understanding of the present disclosure, but the present disclosure can be practiced in the matter other than those as described herein; it is to be understood that the embodiments disclosed in the specification are only a few embodiments of the present disclosure, and not all embodiments.

In UI design software, the function of displaying a text on a control can improve the work efficiency of designers and is a technical problem that needs to be solved urgently at present.

In order to solve the above technical problem or at least partially solve the above technical problem, an embodiment of the present disclosure provides a text display method, which achieves a function of displaying a text on a control in UI design software by automatically truncating characters that exceed a container range, and improves work efficiency of designers while ensuring a text display effect.

Figure 1:
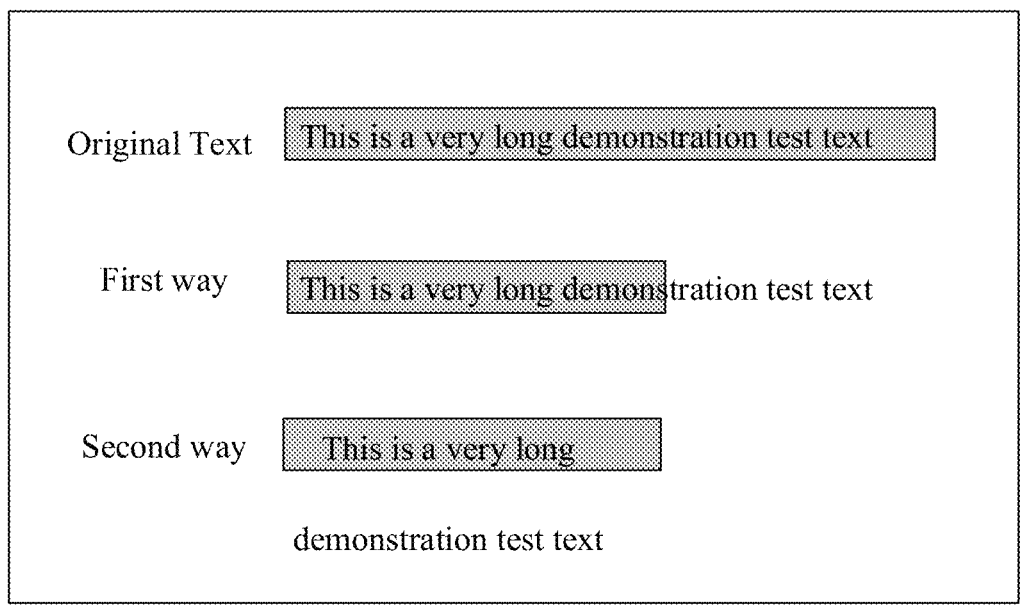
FIG. 1 is a diagram illustrating two conventional ways of processing a displayed text.

In UI design software, how to process a display text exceeding the width of a text box is a technical problem that needs to be solved urgently. As shown in FIG. 1, it is a schematic diagram of two existing processing ways for displaying text, that is, the first way: under the condition that the width of the text box is reduced, the text display condition is not changed. Obviously, such way of processing the text display cannot meet the use requirement of a software design user, and the use experience of the software by the software design user is reduced. The second way: under the condition that the width of the text box is reduced, the text displayed in the text box is automatically displayed in a line wrap manner, but the text displayed in the line wrap manner is displayed in the area outside the text box. Obviously, such way of processing the text display cannot meet the use requirement of a software design user, and the software use experience of the software design user is reduced.

As can be seen, the text display function in the UI design software described above cannot meet the use requirements of the user, and for this reason, the embodiment of the present disclosure provides a text display method, where first, determining a length of entered text within a first container and a current width of the first container, and if it is determined that the current width of the first container is less than the length of the entered text, determining a target truncated character from the entered text; then deleting characters behind the target truncated character in the entered text, and adding a preset symbol at a next position adjacent to the target truncated character to obtain a truncated text corresponding to the entered text; and displaying the truncated text in the first container. According to the embodiment of the disclosure, the characters beyond the container range are automatically truncated, and the preset symbol such as ' . . . ' is added, so that the function of displaying the text on the control in the UI design software is realized, and the work efficiency of designers is improved while the text display effect is ensured.

Figure 2:
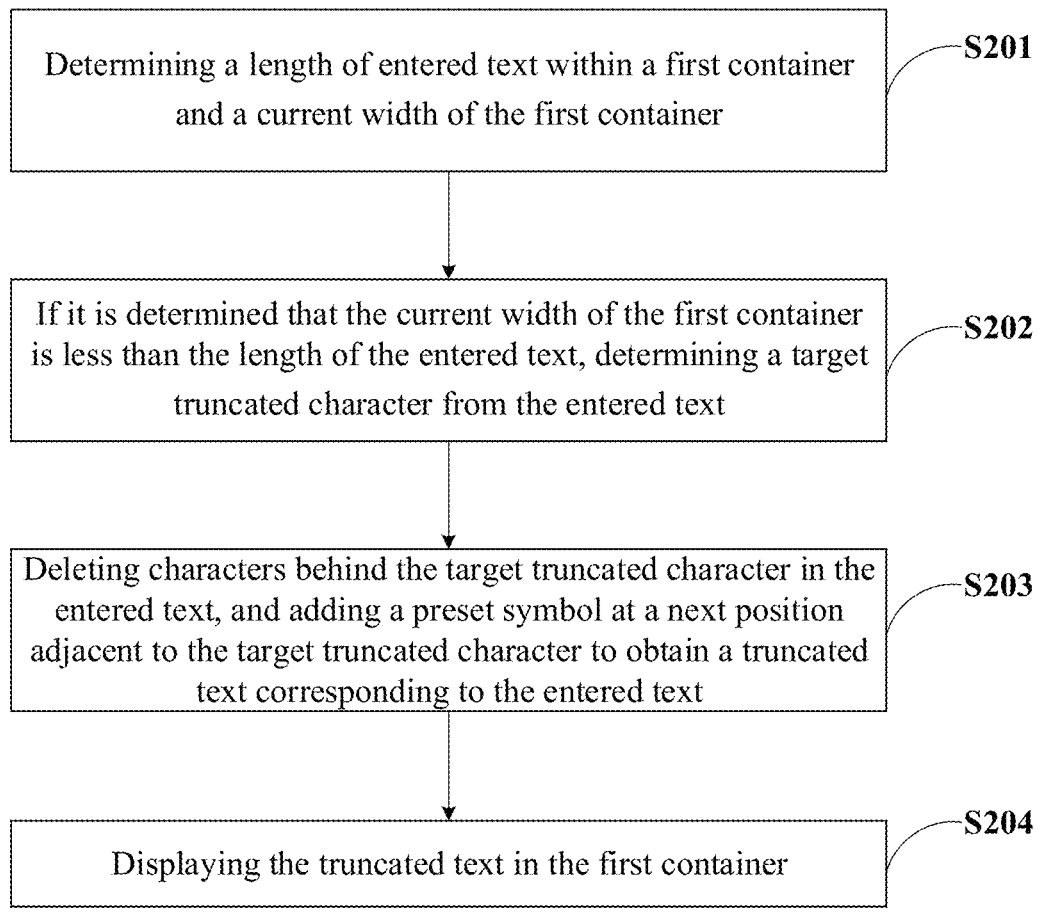
FIG. 2 is a flowchart of a text display method according to an embodiment of the present disclosure.

Based on this, an embodiment of the present disclosure provides a text display method, and with reference to FIG. 2, which is a flowchart of the text display method provided in the embodiment of the present disclosure, the method includes:

s201: determining a length of entered text within a first container and a current width of the first container.

The first container is used for bearing texts displayed on a target control.

The target control can be a control capable of displaying text in the UI design software, for example, the target control can be a textbox, a button, or the like. In the UI design software, the target control has a corresponding container (hereinafter referred to as a first container) for bearing text displayed on the target control. Wherein the first container can be any one of the containers in the UI design software.

In the embodiment of the present disclosure, after the text is entered in the first container, the length of the entered text in the first container and the current width of the first container are determined, so as to determine whether a truncation requirement exists for the entered text in the first container by comparing the sizes of the two.

Specifically, the length of the entered text in the first container refers to the length from the first character to the last character in the entered text in the first container.

In practice, the width of the first container in the UI design software is adjustable, and the width of the first container can be increased or decreased by pulling the edge of the first container.

In an alternative embodiment, when an adjustment operation for the current width of the first container is received, for example, the current width of the first container is adjusted from large to small, the length of the entered text in the first container and the current width of the first container are first determined, and then whether the text is required to be truncated is determined by comparing the sizes of the two.

S202: if it is determined that the current width of the first container is less than the length of the entered text, determining a target truncated character from the entered text.

Wherein the entered text comprises a plurality of characters.

In the embodiment of the present disclosure, after determining the length of the entered text in the first container and the current width of the first container, the size relationship between the two is determined. When the current width of the first container is determined to be smaller than the length of the entered text in the first container, the entered text in the first container is indicated to be beyond the display range of the first container. At the moment, the entered text in the first container needs to be truncated. Therefore, a target truncated character is determined from the entered text in the first container, and then the entered text is truncated by taking the target truncated character as a boundary point.

In an alternative embodiment, the $n^{th}$ character in the entered text in the first container can be determined as the target truncated character, where N can be a natural number set in advance based on experience.

In another alternative embodiment, the current traversal character is determined by traversing characters in the entered text in the first container. Then, the length from the first character in the entered text in the first container to the current traversal character is determined as a first length, and the length from the first character in the entered text in the first container to the next character adjacent to the current traversal character is determined as a second length. When the sum of the first length and the width of the preset symbol is determined to be not more than the current width of the first container and the sum of the second length and the width of the preset symbol is determined to be more than the current width of the first container, the current traversal character is determined as a target truncation character. The preset symbol can be a special symbol such as an ellipsis " . . . " for indicating that there is hidden text not shown in the first container.

In an alternative embodiment, a forward traversal can be started from the last character of the entered text in the first container, and each character can be determined as the current traversal character in sequence until the target truncated character is determined from the entered text.

In another alternative embodiment, a backward traversal can be started from the first character of the entered text in the first container, and each character is determined as the current traversal character in sequence until the target truncated character is determined from the entered text.

Figure 3:
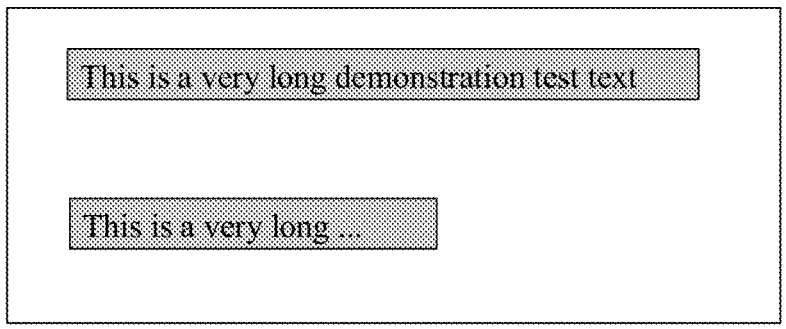
FIG. 3 is a schematic diagram illustrating a method for determining a target truncated character according to an embodiment of the present disclosure.

In order to facilitate understanding of the above embodiments, referring to FIG. 3, a schematic diagram of a method for determining a target truncated character provided for an embodiment of the present disclosure is shown, where an entered text in a first container is "this is a very long demonstration test text". It is assumed that a traversal is started from a last character "text", and since the target truncated character is usually located before the last character "text", a previous character "test" adjacent to "text" is first determined as a current traversal character, then a length from the first character "this" to the current traversal character "test" is determined as a first length W1, and a length from the first character "this" to the next character "text" of the current traversal character "text" is determined as a second length W2. The sum of the width W of the first length W1 and the preset symbol " . . . " and the sum of the width W of the second length W2 and the preset symbol " . . . " are calculated. Then the magnitude relation of W1+W and the current width W0 of the first container is determined, and the magnitude relation of W2+W and W0 is determined. If it is determined that W1+W<=W0 and W2+W>W0, the current traversal character can be determined as the target truncated character. Otherwise, the character "demonstration" is continuously determined as the current traversal character, and whether the character "demonstration" is the target truncated character is continuously determined in the above manner. The characters in the first container are sequentially traversed until the target truncated character is determined.

As shown in FIG. 3, the fifth character "long" in the entered text in the first container can be determined as the target truncated character based on the above manner, and then the truncation process for the entered text can be implemented based on the target truncated character.

S203: deleting characters behind the target truncated character in the entered text, and adding a preset symbol at a next position adjacent to the target truncated character to obtain a truncated text corresponding to the entered text.

In the embodiment of the present disclosure, after determining the target truncated character in the entered text, the character in the entered text after the target truncated character is deleted. Then, after deleting the character, a preset symbol, for example, an ellipsis " . . . ", is added at a position next to the target truncated character to represent that there is a character hidden and not displayed in the first container. Based on the above manner, a truncated text corresponding to the entered text can be obtained.

Referring to FIG. 3 above, after determining that the eighth character "long" in the entered text "this is a very long demonstration test text" is the target truncated character, the character after "long" is deleted, and the entered text after character deletion is "this is a very long". At this time, in order to characterize that there is a character hidden and not displayed, a preset symbol can be added after the target truncated character "long", resulting in the truncated text "this is a very long . . . " shown in FIG. 3.

S204: displaying the truncated text in the first container.

In the embodiment of the disclosure, after the truncated text corresponding to the text entered in the first container is determined, the truncated text is displayed in the first container, so that the text displayed on the control corresponding to the first container does not have the effect of displaying beyond the range, and the user experience is ensured.

In the embodiment of the disclosure, when the same text is displayed in the containers of different sizes, the display length can be adaptively adjusted, characters beyond the range of the container are hidden, and the text display effect is ensured.

In an alternative embodiment, in the case that the truncated text is displayed in the first container, if an adjustment operation on the current width of the first container is received, it is first determined whether the current width of the first container is smaller than the length of the entered text. If it is determined that the current width of the first container is not smaller than the length of the entered text, it indicates that the user adjusts the current width of the first container from small to large. At this time, characters hidden and not displayed need to be displayed again in the first container.

In the using process of the UI design software, not only the width adjustment but also the height adjustment of the first container are supported. Once the height of the first container is adjusted from large to small, the text displayed in the first container can exceed the range of the first container. Therefore, in the embodiments of the present disclosure, when an adjustment operation on a current height of the first container is received, it first determines whether a height of the truncated text displayed within the first container is greater than the current height of the first container (i.e., the height after the adjustment). If it is determined that the height of the truncated text is larger than the current height of the first container, the truncated text displayed in the first container can be cut.

Figure 4:
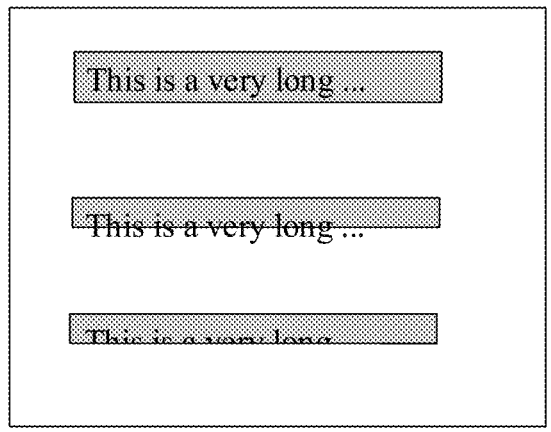
FIG. 4 is a schematic diagram illustrating cutting of a truncated text displayed in a first container according to an embodiment of the present disclosure.

As shown in FIG. 4, a schematic diagram for cutting a truncated text displayed in a first container is provided for the embodiment of the present disclosure, where a height of the container is adjusted so that a display range of the truncated text "this is a very long . . . " in the first container exceeds the range, so that the embodiment of the present disclosure can automatically cut the truncated text displayed in the first container. As shown in FIG. 4, thus the display of the truncated text no longer exceeds the range of the first container, and the use experience of the UI design software by the user is improved.

In the text display method provided by the embodiment of the disclosure, first, determining a length of entered text within a first container and a current width of the first container, and if it is determined that the current width of the first container is less than the length of the entered text, determining a target truncated character from the entered text; then deleting characters behind the target truncated character in the entered text, and adding a preset symbol at a next position adjacent to the target truncated character to obtain a truncated text corresponding to the entered text; and displaying the truncated text in the first container. According to the embodiment of the disclosure, the characters beyond the container range are automatically truncated, and the preset symbol such as ' . . . ' is added, so that the function of displaying the text on the control in the UI design software is realized, and the work efficiency of designers is improved while the text display effect is ensured.

Figure 5:
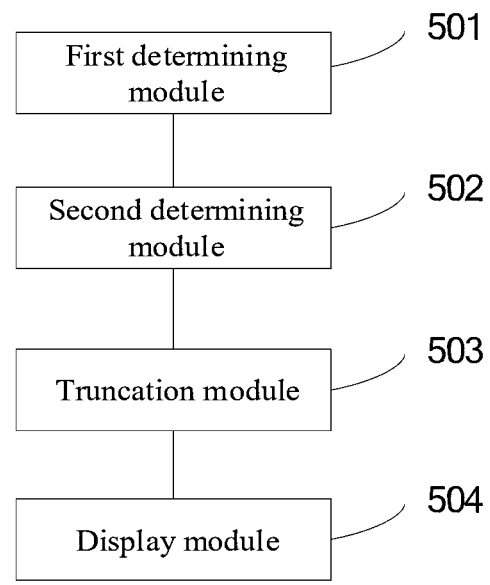
FIG. 5 is a schematic structural diagram of a text display device according to an embodiment of the present disclosure.

Based on the above method embodiment, the present disclosure further provides a text display device, and referring to FIG. 5, the text display device provided in the embodiment of the present disclosure is schematically configured, where the text display device includes:

a first determining module 501, configured to determine a length of entered text within a first container and a current width of the first container; the first container is used for bearing texts displayed on a target control;

a second determining module 502, configured to determine a target truncated character from the entered text when it is determined that the current width of the first container is less than the length of the entered text; wherein the entered text comprises a plurality of characters;

a truncation module 503, configured to delete characters behind the target truncated character in the entered text, and adding a preset symbol at a next position adjacent to the target truncated character to obtain a truncated text corresponding to the entered text;

a display module 504, configured to display the truncated text in the first container.

In an optional implementation manner, the first determining module is specifically configured to:

in response to an adjustment operation on the current width of the first container, determine the length of the entered text within the first container and the current width of the first container.

In an optional implementation manner, the second determining module includes:

a first determining sub-module configured to determine a length from a first character to a current traversal character in the entered text as a first length;

a second determining sub-module, configured to determine a length from the first character to a next character adjacent to the current traversal character in the entered text as a second length; and a third determining sub-module configured to when it is determined that a sum of the first length and a width of the preset symbol is not larger than the current width of the first container and a sum of the second length and the width of the preset symbol is larger than the current width of the first container, determine the current traversal character as the target truncation character.

In an alternative embodiment, the device further comprises:

a third determining module configure to traverse from last character of the entered text forward or from the first character of the entered text backward, to determine the current traversed character.

In an alternative embodiment, the device further comprises:

a fourth determining module configured to in response to an adjustment operation on the current width of the first container, determine whether the current width of the first container is less than the length of the entered text;

a replacing module configured to if it is determined that the current width of the first container is not less than the length of the entered text, display the entered text in the first container after replacing the truncated text with the entered text.

In an alternative embodiment, the device further comprises:

a fifth determining module configured to in response to an adjustment operation on a current height of the first container, determine whether a height of the truncated text displayed within the first container is greater than the current height of the first container; and a cutting module configured to if it is determined that the height of the truncated text is larger than the current height of the first container, cut the truncated text displayed in the first container.

In the text display apparatus provided by the embodiment of the disclosure, first, determining a length of entered text within a first container and a current width of the first container, and if it is determined that the current width of the first container is less than the length of the entered text, determining a target truncated character from the entered text; then deleting characters behind the target truncated character in the entered text, and adding a preset symbol at a next position adjacent to the target truncated character to obtain a truncated text corresponding to the entered text; and displaying the truncated text in the first container. According to the embodiment of the disclosure, the characters beyond the container range are automatically truncated, and the preset symbol such as ' . . . ' is added, so that the function of displaying the text on the control in the UI design software is realized, and the work efficiency of designers is improved while the text display effect is ensured.

In addition to the method and apparatus described above, the present disclosure further provides a non-transitory computer-readable storage medium, where instructions are stored, and when the instructions are executed on a terminal device, the terminal device is enabled to perform the text display method described in the embodiments of the present disclosure.

Embodiments of the present disclosure also provide a computer program product, which includes a computer program/instruction, when executed by a processor, to perform the text display method according to the embodiments of the present disclosure.

The embodiment of the present disclosure further provides a computer program, and the computer program when executed by a processor, perform the text display method according to the embodiment of the present disclosure.

Figure 6:
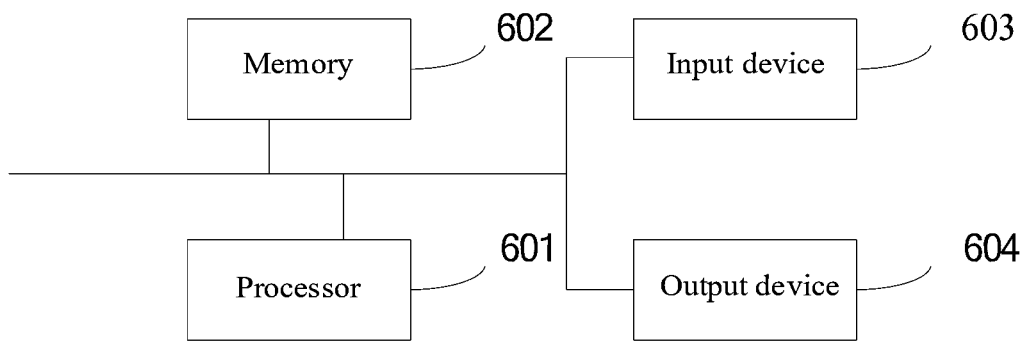
FIG. 6 is a schematic structural diagram of a text display apparatus according to an embodiment of the present disclosure.

In addition, an embodiment of the present disclosure further provides a text display device, as shown in FIG. 6, which can include:

a processor 601, a memory 602, an input device 603, and an output device 604. The number of processors 601 in the text display device can be one or more, and one processor is taken as an example in FIG. 6. In some embodiments of the present disclosure, the processor 601, the memory 602, the input device 603 and the output device 604 can be connected by a bus or other means, wherein the connection by the bus is exemplified in FIG. 6.

The memory 602 can be used to store software programs and modules, and the processor 601 performs various functional applications and data processing of the text display device by operating the software programs and modules stored in the memory 602. The memory 602 can mainly include a program storage area and a data storage area, wherein the program storage area can store an operating system, an application program required for at least one function, and the like. Further, the memory 602 can include high speed random access memory, and can also include non-volatile memory, such as at least one magnetic disk storage device, flash memory device, or other volatile solid state storage device. The input device 603 can be used to receive entered numeric or character information and generate signal inputs relating to user settings and function controls of the text display apparatus.

Specifically, in this embodiment, the processor 601 loads an executable file corresponding to a process of one or more application programs into the memory 602 according to the following instructions, and the processor 601 runs the application programs stored in the memory 602, thereby implementing various functions of the text display device.

It is noted that, in this document, relational terms such as "first" and "second," and the like, are used solely to distinguish one entity or action from another entity or action without necessarily requiring or implying any actual such relationship or order between such entities or actions. Also, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. Without further limitation, an element defined by the phrase "comprising an . . . " does not exclude the presence of other identical elements in the process, method, article, or apparatus that comprises the element.

The previous description is only for the purpose of describing particular embodiments of the present disclosure, so as to enable those skilled in the art to understand or implement the present disclosure. Various modifications to these embodiments will be readily apparent to those skilled in the art, and the generic principles defined herein can be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A text display method, the method comprising:
   determining a length of entered text within a first container and a current width of the first container; the first container is used for bearing texts displayed on a target control;
   if it is determined that the current width of the first container is less than the length of the entered text, determining a target truncated character from the entered text; wherein the entered text comprises a plurality of characters;
   deleting characters behind the target truncated character in the entered text, and adding a preset symbol at a next position adjacent to the target truncated character to obtain a truncated text corresponding to the entered text; and
   displaying the truncated text in the first container.

2. The method of claim 1, wherein the determining a length of entered text within a first container and a current width of the first container comprises:
   in response to an adjustment operation on the current width of the first container, determining the length of the entered text within the first container and the current width of the first container.

3. The method of claim 1, wherein the determining a target truncated character from the entered text comprises:
   determining a length from a first character to a current traversal character in the entered text as a first length;
   determining a length from the first character to a next character adjacent to the current traversal character in the entered text as a second length; and
   when it is determined that a sum of the first length and a width of the preset symbol is not larger than the current width of the first container and a sum of the second length and the width of the preset symbol is larger than the current width of the first container, determining the current traversal character as the target truncation character.

4. The method of claim 3, wherein before the determining a length from a first character to a current traversal character in the entered text as a first length, the method further comprises:
   traversing from last character of the entered text forward or from the first character of the entered text backward, to determine the current traversed character.

5. The method of claim 1, wherein after displaying the truncated text in the first container, the method further comprises:
   in response to an adjustment operation on the current width of the first container, determining whether the current width of the first container is less than the length of the entered text; and
   if it is determined that the current width of the first container is not less than the length of the entered text, displaying the entered text in the first container after replacing the truncated text with the entered text.

6. The method of claim 1, wherein after displaying the truncated text in the first container, the method further comprises:
   in response to an adjustment operation on a current height of the first container, determining whether a height of the truncated text displayed within the first container is greater than the current height of the first container; and
   if it is determined that the height of the truncated text is larger than the current height of the first container, cutting the truncated text displayed in the first container.

7. A non-transitory computer-readable storage medium having stored therein instructions that, when executed on a terminal device, cause the terminal device to:

determine a length of entered text within a first container and a current width of the first container; the first container is used for bearing texts displayed on a target control;

if it is determined that the current width of the first container is less than the length of the entered text, determine a target truncated character from the entered text; wherein the entered text comprises a plurality of characters;

delete characters behind the target truncated character in the entered text, and add a preset symbol at a next position adjacent to the target truncated character to obtain a truncated text corresponding to the entered text; and display the truncated text in the first container.

8. An apparatus comprising: a memory, a processor, and a computer program stored on the memory and executable on the processor, the processor, when executing the computer program, is configured to:

determine a length of entered text within a first container and a current width of the first container; the first container is used for bearing texts displayed on a target control;

if it is determined that the current width of the first container is less than the length of the entered text, determine a target truncated character from the entered text; wherein the entered text comprises a plurality of characters;

delete characters behind the target truncated character in the entered text, and add a preset symbol at a next position adjacent to the target truncated character to obtain a truncated text corresponding to the entered text; and display the truncated text in the first container.

9. The storage medium of claim 7, wherein the instructions, when executed on a terminal device, further cause the terminal device to:

in response to an adjustment operation on the current width of the first container, determine the length of the entered text within the first container and the current width of the first container.

10. The storage medium of claim 7, wherein the instructions, when executed on a terminal device, further cause the terminal device to:

determine a length from a first character to a current traversal character in the entered text as a first length;

determine a length from the first character to a next character adjacent to the current traversal character in the entered text as a second length; and when it is determined that a sum of the first length and a width of the preset symbol is not larger than the current width of the first container and a sum of the second length and the width of the preset symbol is larger than the current width of the first container, determine the current traversal character as the target truncation character.

11. The storage medium of claim 7, wherein the instructions, when executed on a terminal device, further cause the terminal device to:

traverse from last character of the entered text forward or from the first character of the entered text backward, to determine the current traversed character.

12. The storage medium of claim 11, wherein the instructions, when executed on a terminal device, further cause the terminal device to:

in response to an adjustment operation on the current width of the first container, determine whether the current width of the first container is less than the length of the entered text; and if it is determined that the current width of the first container is not less than the length of the entered text, display the entered text in the first container after replacing the truncated text with the entered text.

13. The storage medium of claim 7, wherein the instructions, when executed on a terminal device, further cause the terminal device to:

in response to an adjustment operation on a current height of the first container, determine whether a height of the truncated text displayed within the first container is greater than the current height of the first container; and if it is determined that the height of the truncated text is larger than the current height of the first container, cut the truncated text displayed in the first container.

14. The apparatus of claim 8, wherein the processor is further configured to:

in response to an adjustment operation on the current width of the first container, determine the length of the entered text within the first container and the current width of the first container.

15. The apparatus of claim 8, wherein the processor is further configured to:

determine a length from a first character to a current traversal character in the entered text as a first length;

determine a length from the first character to a next character adjacent to the current traversal character in the entered text as a second length; and when it is determined that a sum of the first length and a width of the preset symbol is not larger than the current width of the first container and a sum of the second length and the width of the preset symbol is larger than the current width of the first container, determine the current traversal character as the target truncation character.

16. The apparatus of claim 15, wherein the processor is further configured to:

traverse from last character of the entered text forward or from the first character of the entered text backward, to determine the current traversed character.

17. The apparatus of claim 8, wherein the processor is further configured to:

in response to an adjustment operation on the current width of the first container, determine whether the current width of the first container is less than the length of the entered text; and if it is determined that the current width of the first container is not less than the length of the entered text, display the entered text in the first container after replacing the truncated text with the entered text.

18. The apparatus of claim 8, wherein the processor is further configured to:

in response to an adjustment operation on a current height of the first container, determine whether a height of the truncated text displayed within the first container is greater than the current height of the first container; and if it is determined that the height of the truncated text is larger than the current height of the first container, cut the truncated text displayed in the first container.

* * * * *